(12) United States Patent
Han et al.

(10) Patent No.: US 8,089,489 B2
(45) Date of Patent: Jan. 3, 2012

(54) METHOD FOR CONVERTING A SOURCE GAMUT OF AN IMAGE TO A DESTINATION GAMUT

(75) Inventors: Yao Han, Lexington, KY (US); Xuan-Chao Huang, Lexington, KY (US); Brant Dennis Nystrom, Lexington, KY (US); Richard Lee Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 2058 days.

(21) Appl. No.: 10/957,032

(22) Filed: Sep. 30, 2004

(65) Prior Publication Data
US 2006/0072133 A1 Apr. 6, 2006

(51) Int. Cl.
*G09G 5/02* (2006.01)
(52) U.S. Cl. ........................................................ 345/590
(58) Field of Classification Search .................. None
See application file for complete search history.

(56) References Cited

U.S. PATENT DOCUMENTS

| | | | |
|---|---|---|---|
| 5,731,818 A | 3/1998 | Wan et al. | |
| 6,104,829 A | 8/2000 | Nakajima | |
| 6,151,136 A | 11/2000 | Takemoto | |
| 6,198,843 B1 | 3/2001 | Nakauchi et al. | |
| 6,342,951 B1 | 1/2002 | Eschbach et al. | |
| 6,359,703 B1 | 3/2002 | Yabe | |
| 6,360,007 B1 | 3/2002 | Robinson et al. | |
| 6,388,674 B1 | 5/2002 | Ito et al. | |
| 6,400,843 B1 | 6/2002 | Shu et al. | |
| 6,437,792 B1 | 8/2002 | Ito et al. | |
| 6,459,500 B1 * | 10/2002 | Takaoka | 358/1.9 |
| 6,603,879 B2 | 8/2003 | Haikin et al. | |
| 6,719,392 B2 | 4/2004 | Qiao | |
| 2003/0103103 A1 * | 6/2003 | Smith | 347/43 |

FOREIGN PATENT DOCUMENTS

JP 2003338938 A * 11/2003

* cited by examiner

*Primary Examiner* — Aaron M Richer

(57) ABSTRACT

A method for converting a source gamut of an image to a destination gamut includes providing an imaging apparatus having a plurality of destination gamuts, determining a source gamut boundary for the source gamut of the image; selecting an appropriate destination gamut from the plurality of destination gamuts based on a desired output; mapping to the appropriate destination gamut based at least in part on the source gamut boundary; and determining a color conversion lookup table based on the mapping to the appropriate destination gamut for use in replicating the image to provide the desired output using the imaging apparatus.

21 Claims, 9 Drawing Sheets

METHOD FOR CONVERTING A SOURCE GAMUT OF AN IMAGE TO A DESTINATION GAMUT

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND OF THE INVENTION

1. Field of the Invention

The present invention relates to an imaging apparatus, and, more particularly, to an imaging apparatus and method for converting a source gamut of an image to a destination gamut.

2. Description of the Related Art

The use of all-in-one (AIO) imaging apparatuses with a scanner and printer is proliferating in both home and office environments. One of the primary uses of an AIO imaging apparatus is copying images or documents created from different sources. The sources may be images previously printed with a printer or the same imaging apparatus, magazines, hand paintings, etc. The variation in color gamut output by different sources may vary considerably. For example, the color gamut of images printed by inkjet printers may be much smaller than that of images from magazines produced by industrial magazine printers. In other words, one source of images or documents may be much different from another source in terms of color gamut, and this difference depends on the source producers (e.g., home-used inkjet printer, industrial printer, painter, etc.). Ideally, one may expect that the AIO system possesses a big color gamut that can accommodate all color gamuts of various copying sources. However, the AIO system's color gamut is limited and usually small since it depends on not only the scanner color gamut but also the associated printer color gamut, both of which may be small. With this limited condition, a challenging problem encountered by color reproduction engineers is how to reproduce the color gamuts from various sources of documents so as to allow a user to easily and optimally replicate an image obtained from one of the various sources.

What is needed in the art is an imaging apparatus and method for converting a source gamut of an image to a destination gamut.

SUMMARY OF THE INVENTION

The present invention provides an imaging apparatus and method for converting a source gamut of an image to a destination gamut.

The invention, in one form thereof, relates to a method for converting a source gamut of an image to a destination gamut. The method includes providing an imaging apparatus having a plurality of destination gamuts; determining a source gamut boundary for the source gamut of the image; selecting an appropriate destination gamut from the plurality of destination gamuts based on a desired output; mapping to the appropriate destination gamut based at least in part on the source gamut boundary; and determining a color conversion lookup table based on the mapping to the appropriate destination gamut for use in replicating the image to provide the desired output using the imaging apparatus.

The invention, in another form thereof, relates to an imaging apparatus for converting a source gamut of an image to a destination gamut and replicating the image. The imaging apparatus includes a scanner, a print engine configured to mount a printing cartridge and to print on a substrate using the printing cartridge, a plurality of destination gamuts associated with the scanner and the print engine, and a controller communicatively coupled to the print engine and to the scanner. The controller executes instructions to determine a source gamut boundary for the source gamut; select an appropriate destination gamut from the plurality of destination gamuts based on a user's desired output; perform mapping to the appropriate destination gamut based at least in part on the source gamut boundary; determine a color conversion lookup table based on the mapping to the appropriate destination gamut; scan the image using the scanner to obtain image data; and replicate the image using the image data and the color conversion lookup table to provide the desired output.

The invention, in yet another form thereof, relates to a method for converting a source gamut of an image to a destination gamut and replicating the image. The method includes providing an imaging apparatus having a plurality of destination gamuts; determining a source gamut boundary for the source gamut; selecting an appropriate destination gamut from the plurality of destination gamuts based on a desired output; mapping to the appropriate destination gamut based at least in part on the source gamut boundary; determining a color conversion lookup table based on the mapping to the appropriate destination gamut; scanning the image to obtain image data; and replicating the image based on the image data and the color conversion lookup table to provide the desired output.

With the present invention, image replication may be performed with less user input, while providing a more optimal gamut mapping than in a conventional imaging apparatus. Further the speed of replicating an image may be increased.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
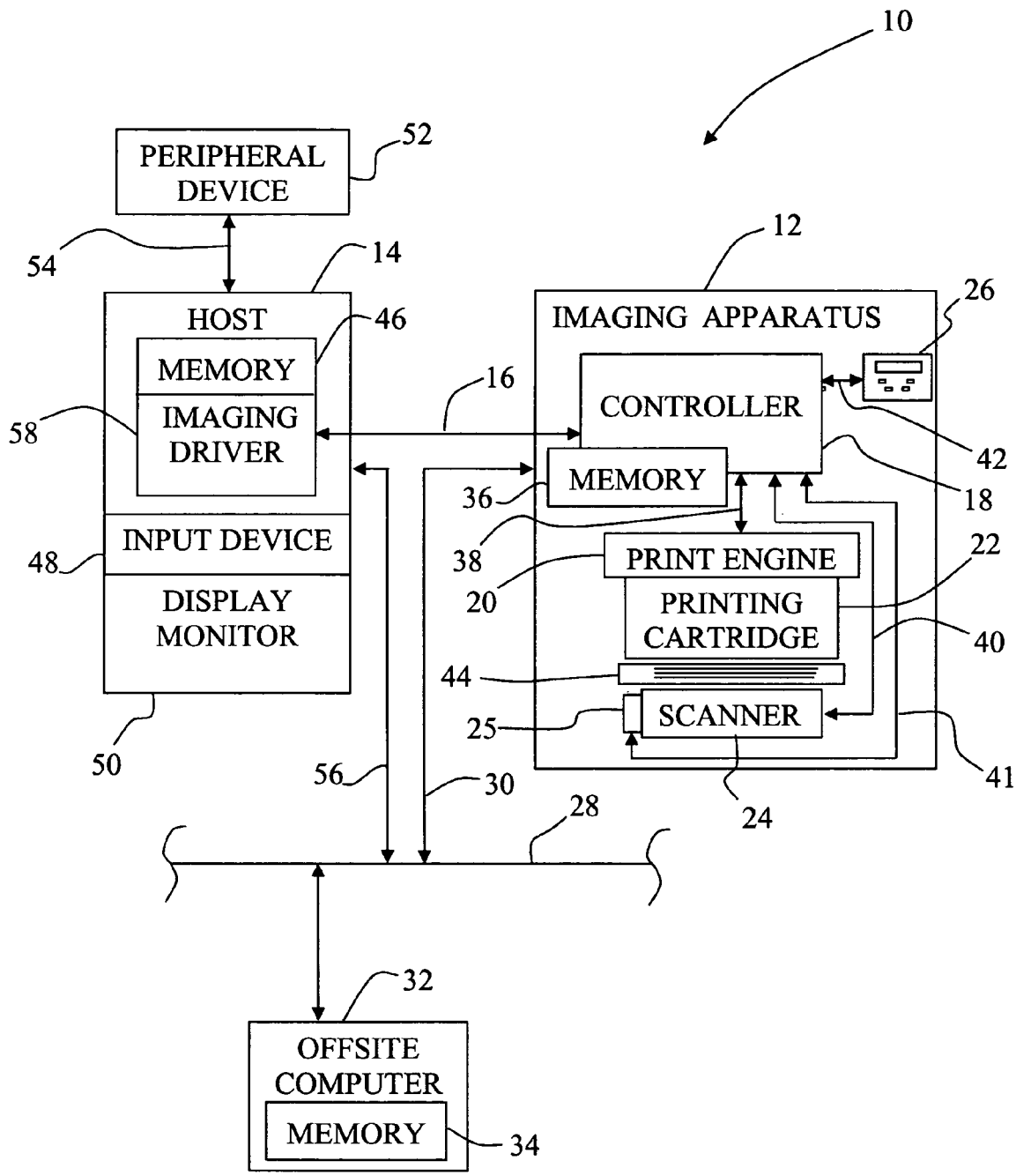
FIG. 1 is a diagrammatic depiction of an imaging system that employs an imaging apparatus in accordance with the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

Imaging apparatus 12 may be, for example, an ink jet printer and/or copier, or an electrophotographic printer and/or copier that is used in conjunction with a scanner, or an all-in-one (AIO) unit that includes a printer, a scanner, and possibly a fax unit. In the present embodiment, imaging apparatus 12 is an AIO unit, and includes a controller 18, a print engine 20, a printing cartridge 22, a scanner 24, a print media sensor 25, and a user interface 26. Imaging apparatus 12 has access to a network 28, such as the Internet, via a communication line 30, to interface with an offsite computer 32 having an offsite memory 34, in order to transmit and/or receive data for use in carrying out its imaging functions.

Controller 18 includes a processor unit and associated memory 36, and may be formed as one or more Application Specific Integrated Circuits (ASIC). Controller 18 may be a printer controller, a scanner controller, or may be a combined printer and scanner controller. Although controller 18 is depicted in imaging apparatus 12, alternatively, it is contemplated that all or a portion of controller 18 may reside in host 14 or offsite computer 32. Controller 18 is communicatively coupled to print engine 20 via a communications link 38, to scanner 24 via a communications link 40, to print media sensor 25 via a communications link 41, and to user interface 26 via a communications link 42. Controller 18 serves to process print data and to operate print engine 20 during printing, and serves to operate scanner 24.

In the context of the examples for imaging apparatus 12 given above, print engine 20 may be, for example, an ink jet print engine or a color electrophotographic print engine. Print engine 20 is configured to mount printing cartridge 22 and to print on a substrate 44 using printing cartridge 22. Substrate 44 is a print medium, and may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. Print media sensor 25 is configured to detect the type of substrate 44 used in imaging apparatus 12 for printing or copying. As an ink jet print engine, print engine 20 operates printing cartridge 22 to eject ink droplets onto substrate 44 in order to reproduce text or images, etc. As an electrophotographic print engine, print engine 20 causes printing cartridge 22 to deposit toner onto substrate 44, which is then fused to substrate 44 by a fuser (not shown).

Host 14 may be, for example, a personal computer, including memory 46, an input device 48, such as a keyboard, and a display monitor 50. A peripheral device 52, such as a digital camera, is coupled to host 14 via a communication link 54. Host 14 further includes a processor, input/output (I/O) interfaces, memory, such as RAM, ROM, NVRAM, and at least one mass data storage device, such as a hard drive, a CD-ROM and/or a DVD unit, and is connected to network 28 via a communication line 56. Although host 14 is shown as a separate device, it should be understood that host 14 and its functions or a subset of its functions can also be combined with imaging apparatus 12.

During operation, host 14 includes in its memory a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and may provide formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12 or in offsite memory 34 of offsite computer 32.

Figure 2:
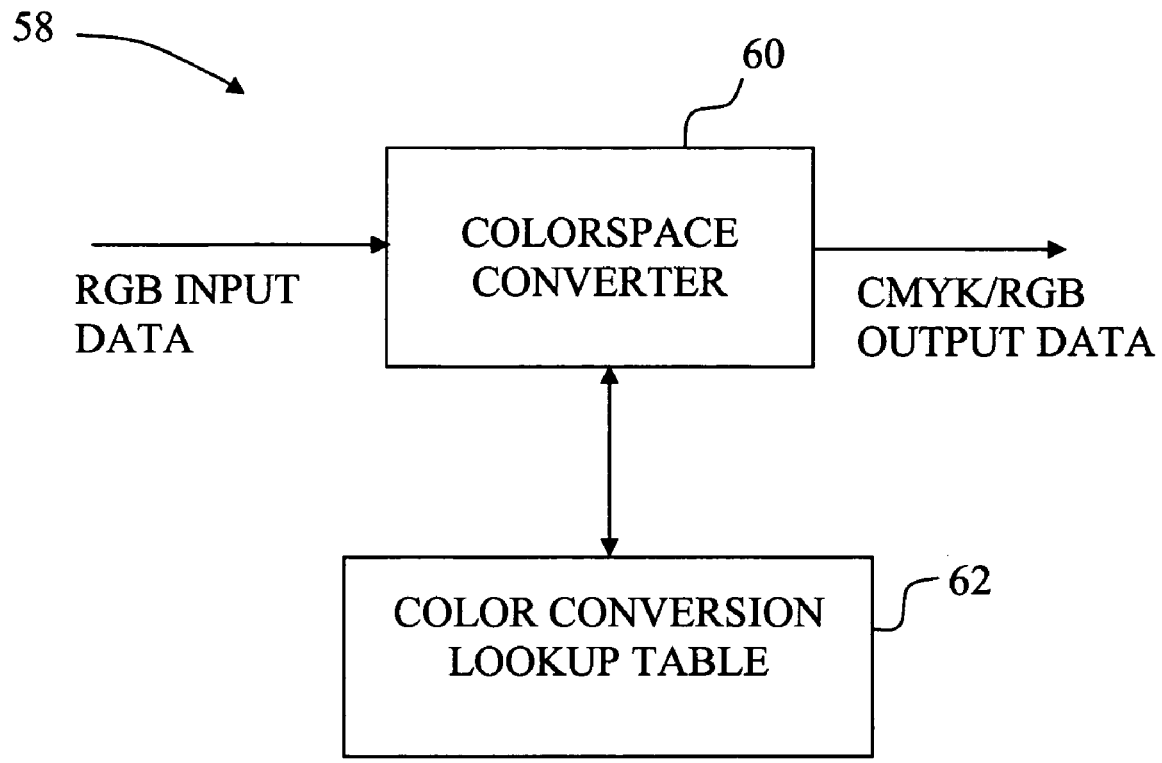
FIG. 2 is a diagrammatic depiction of a colorspace converter accessing a color conversion lookup table.

Referring now to FIG. 2, imaging driver 58 includes a colorspace converter 60. Although described herein as residing in imaging driver 58, colorspace converter 60 may be in the form of firmware or software, and may reside in either imaging driver 58 or controller 18. Alternatively, some portions of colorspace converter 60 may reside in imaging driver 58, while other portions reside in controller 18.

Coupled to colorspace converter 60 is a color conversion lookup table 62. Colorspace converter 60 converts color signals from a first colorspace, such as an RGB colorspace output by display monitor 50 or scanner 24, to a second colorspace using color conversion lookup table 62. For example, the second color space may be CMYK (cyan, magenta, yellow, and black) colorspace, which is used by print engine 20, if the desired output of imaging apparatus 12 is a replication of an image in the form of a copy, i.e., a copied image. The second color space can also be an RGB colorspace, for example, if the desired output of imaging apparatus 12 is a scan-to-file replication of an image that might be displayed on display monitor 50. Color conversion lookup table 62 is a multidimensional lookup table having at least three dimensions, and includes RGB input values and CMYK or RGB output values, wherein each CMYK or RGB output value corresponds to an RGB input value. Color conversion lookup table 62 can also include other data, such as spectral data.

Color conversion lookup table 62 can also be in the form of groups of polynomial functions capable of providing the same multidimensional output as if in the form of a lookup table. As shown in FIG. 2, for example, colorspace converter 60 converts input RBG color data for a scanned image into CMYK or RGB output data, using color conversion lookup table 62, that can be printed by print engine 20 or saved to an image file.

Figure 3A:
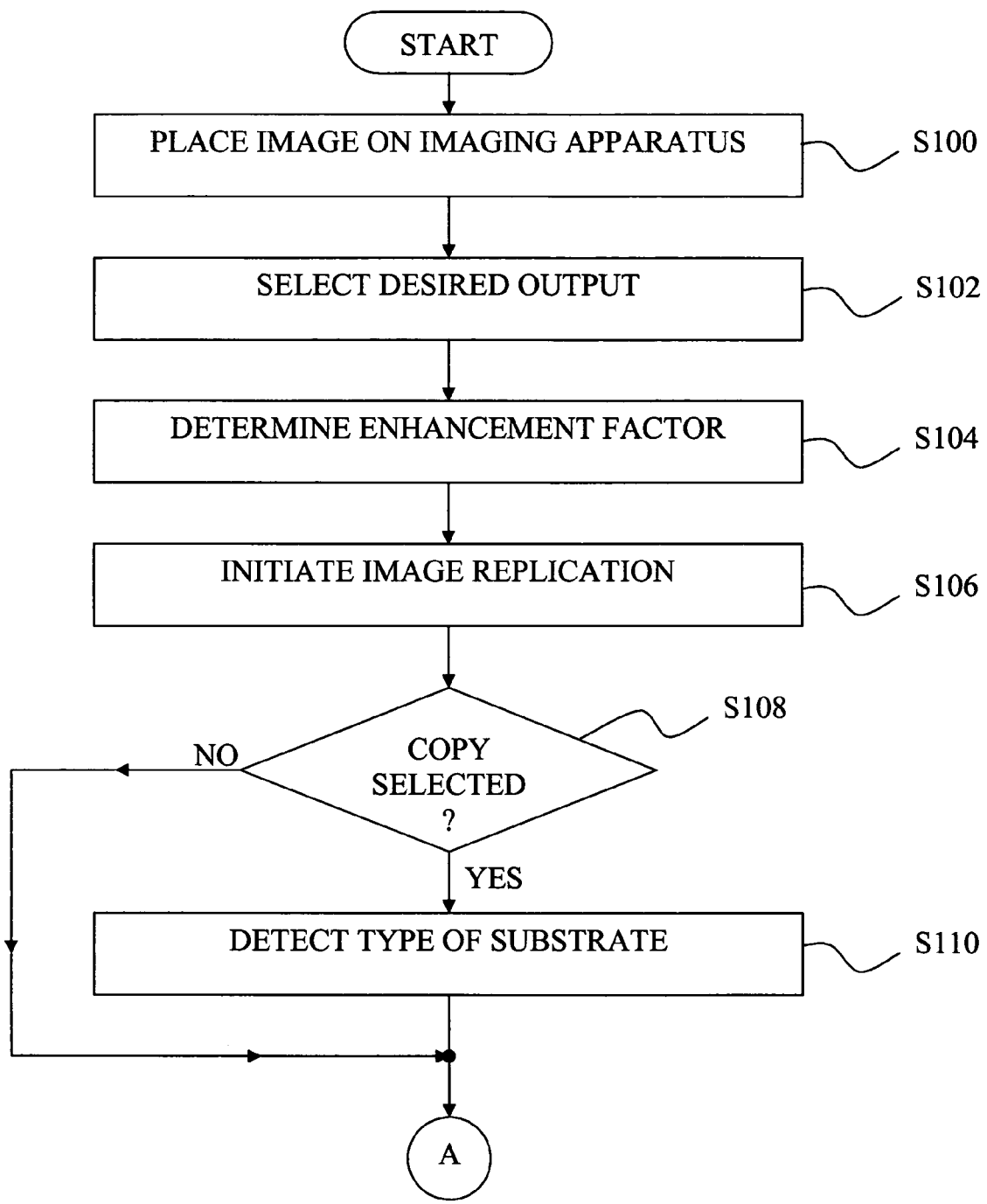
FIGS. 3A and 3B are a flowchart that generally depicts an embodiment of a method of converting a source gamut of an image to a destination gamut and replicating the image in accordance with the present invention.
Figure 3B:
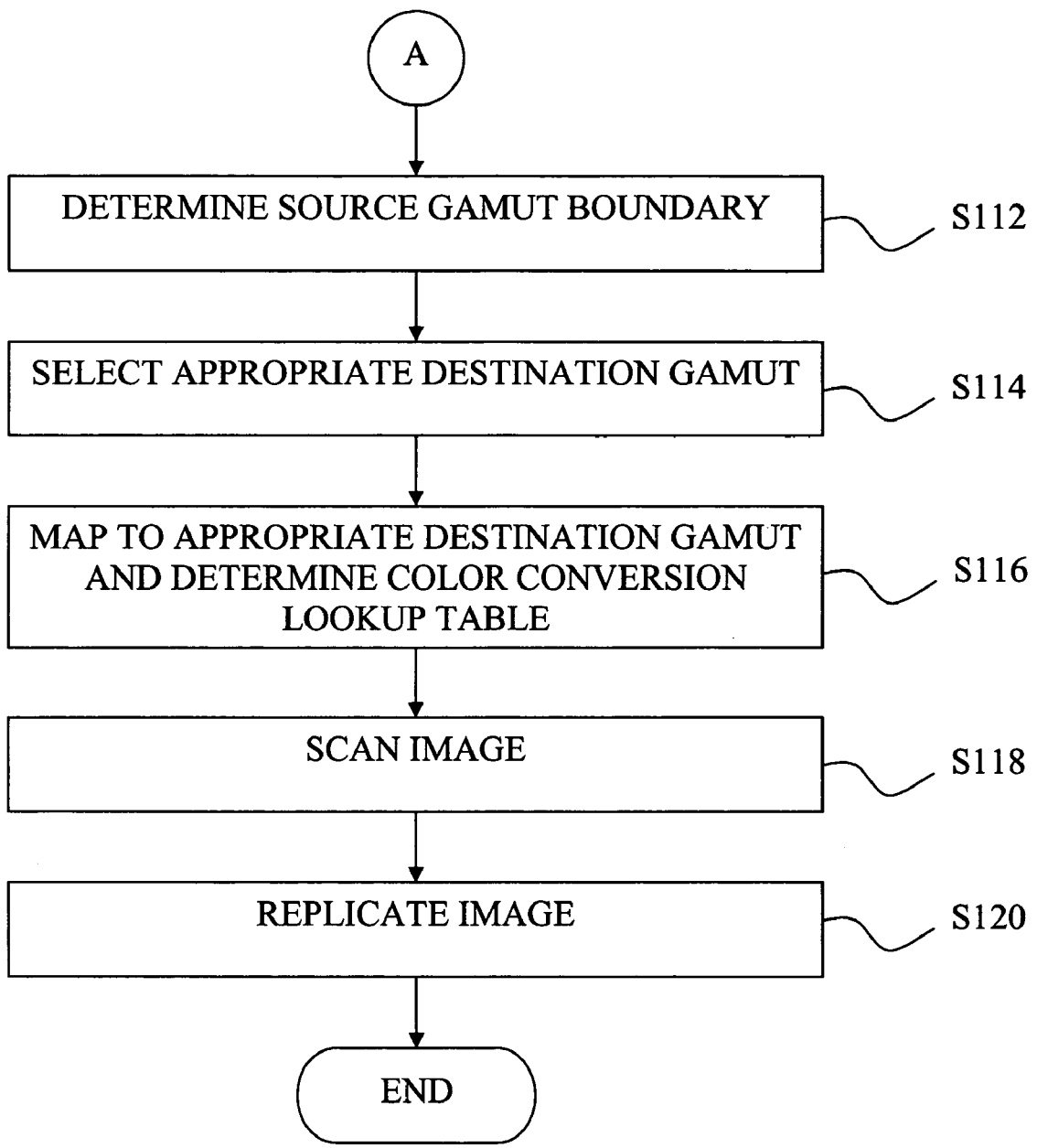

Referring now to FIGS. 3A and 3B, there is generally depicted a method of converting a source gamut of an image to a destination gamut and replicating the image using imaging apparatus 12. Imaging apparatus 12 has a plurality of destination gamuts. For example, the gamut associated with print engine 20 associated with a particular type of substrate 44, or the gamut associated with a scan-to-file image output by imaging apparatus 12. According to the present embodiment, a user needs only to select a desired output, for example, scan-to-file or a copy of the image, i.e., a printed copy, and the optimum color conversion lookup table 62 is determined automatically, including compensation for the type of substrate 44, without the need for any additional input or decision-making by the user. Should the user desire to enhance the image color, for example, to enrich or brighten the color of the image, an enhancement factor may be selected, which is used by the present invention to enhance the chromaticity of the image, for example, by increasing the CIELAB C* values of the image.

At step S100, the user places the image on imaging apparatus 12, for example, on an automatic document feeder (ADF), or on a platen of scanner 24.

At step S102, the user selects a desired output of imaging apparatus 12. For example, the user selects a scan-to-file option, or selects a copy option. If the copy option is selected, and if imaging apparatus 12 has more than one media tray, the user may select a media tray from which substrate 44 will be supplied to print engine 20 for use in copying the image. Otherwise, the default media tray is used. Imaging apparatus 12 provides the desired output to the user, based on the user's choice of scanning the image to a file or copying the image, and based on the type of substrate 44 if copying is selected.

At step S104, an enhancement factor is determined. For example, if the user perceives that the image to be replicated appears washed-out, the user may desire to enrich the colors during replication of the image. Accordingly, the user selects an enhancement factor to be used in replicating the image, for example, an enhancement factor of 1.15, which enhances the chromaticity of the image up to 15%. Otherwise, a default enhancement factor is used, for example, a factory default or a user programmed default enhancement factor, such as a value of 1.0. Enhancement factors less than 1.0 can also be used to devalue the colors during replication of the image.

At step S106, the user initiates replication of the image, such as by pushing a button on imaging apparatus 12. For example, thus user may wish to copy the image onto substrate 44 using imaging apparatus 12, such as by depressing a "Copy" button on imaging apparatus 12, and/or the user may wish to scan the image to an electronic file, such as by depressing a "Scan-To-File" button on imaging apparatus 12.

At step S108, controller 18 determines whether the desired output is to copy the image or to scan the image to a file. If the desired output is to copy the image, the method proceeds to step S110. Otherwise, the method proceeds directly to step S112.

At step S110, controller 18 executes instructions to detect with sensor 25 the type of substrate 44 that will be used in copying the image, for example, before substrate 44 is fed into print engine 20.

At step S112, controller 18 executes instructions to determine the source gamut boundary and the source gamut of the image that the user desires to replicate. The image may be in the form of a photograph, a document, a cut-out from a magazine, a brochure, a form, a page from a book, or any similar such image. The user may desire to replicate the image in the form of a hard copy or a soft copy, or both.

The source gamut boundary is the outermost extent of the image's color gamut, and typically expressed in a three-dimensional colorspace.

In order to determine the source gamut boundary, controller 18 executes instructions to perform a pre-scan of the image using scanner 24 to obtain pre-scanned image data, and to obtain coarse image data therefrom. The pre-scan is a low resolution, fast scan of the image, using scanner 24. For example, when performing the scan, controller 18 selects the lowest resolution/highest speed settings on scanner 24 so as to determine the source gamut and source gamut boundary quickly. The pre-scan does not obtain all of the image data necessary for replicating the image, but rather, quickly obtains coarse image data necessary to determine the image gamut information. Thus, coarse image data is obtained from the pre-scanned image data, and the source gamut boundary is determined based on the coarse image data. By obtaining coarse image data, the gamut mapping process is performed more quickly than if the gamut data would be based on a higher-resolution scan, hence increasing the speed at which an image may be replicated.

Once determined, the source gamut boundary is stored in memory, for example, memory 36.

Step S112 is described in greater detail below with reference to steps S112-1 to S112-3.

At step S114, controller 18 executes instructions to automatically select an appropriate destination gamut from the plurality of destination gamuts of imaging apparatus 12, based on the user's desired output. Here, the term, "appropriate," is used to designate that the destination gamut is appropriate in consideration of the user's desired output. The appropriate destination gamut is automatically selected based at least in part on print media sensor 25 detecting the type of substrate 44.

If the output function is "scan", the destination gamut will be set as that of sRGB (standard RGB). If the output function is "copy", the destination gamut will be set as the printer gamut for the output substrate that is automatically detected by print media sensor 25 or selected by the user. Different substrates may have different destination gamut boundaries. These destination gamut boundaries are stored in a memory, such as memory 36, or with imaging driver 58, and are referred to as $DGB_1, DGB_2, \ldots, DGB_q$, and arranged by gamut volume wherein $DGB_1 < DGB_2 < \ldots < DGB_q$ for a total of q destination gamut boundaries. The corresponding sets of destination gamuts corresponding to these boundaries are represented by:

$$DG_j = \xi_j(dcs) \, j=1,2,\ldots,q \qquad \text{Equation (0)}$$

where DG is the CIELAB color values (L*, a*, b*), dcs represents digital counts of destination device (printer or monitor), e.g., 0-255 for 8-bit color, and $\xi$ denotes the function relationship that can be implemented as a lookup table or a group of polynomial functions. $DGB_j$ is necessarily a subset of $DG_j$, since, for example, $DGB_j$ is given by the outermost 3-dimensional extents of $DG_j$.

At step S116, controller 18 executes instructions to map to the appropriate destination gamut based at least in part on said source gamut boundary, and to determine a color conversion lookup table based on mapping to the appropriate destination gamut. Step S116 includes controller 18 executing instructions to modify the chroma, i.e., the chromaticity, of the source gamut boundary and of the source gamut, respectively, based on the enhancement factor.

Step S116 can be performed in different ways in accordance with the present invention, as described in more detail with respect to the various embodiments of FIGS. 5-8. For example, it may be desirable to classify the source gamut boundary of the image into a class of source gamut boundaries for use with a plurality of predetermined color conversion lookup tables created at the factory, e.g., by the manufacture of imaging apparatus 12, and to employ a class gamut mapping method. Thus, when replicating an image, color conversion lookup table 62 can be selected from the plurality of predetermined color conversion lookup tables, thereby speeding up the process of replicating the image, and minimizing the amount the user would have to wait for the image to be replicated.

Accordingly, present embodiment employs a class gamut mapping method as generally described below in steps S116-1 to S116-8 of FIG. 5. Class gamut mapping in accordance with the present invention can be performed online or offline. The present embodiment class gamut mapping method employs offline mapping, and is described below in steps S216-1 to S216-2 of FIG. 6. An embodiment of the class gamut mapping method using online dynamic mapping (gamut mapping performed by imaging apparatus 12 as part of the image replication process), is described below with respect to steps S316-1 to S316-4 of FIG. 7.

In addition to class gamut mapping embodiments, an embodiment employing continuous online mapping from the source gamut to the appropriate destination gamut can alternatively be employed. For example, step S116 can be performed online by imaging apparatus 12 by using a gamut mapping algorithm stored in a memory, for example, in memory 36 of controller 18, a firmware component of controller 18, or with imaging driver 58. An embodiment of continuous online gamut is described below in greater detail with reference to steps S416-1 to S416-5 of FIG. 8.

Referring again to FIG. 3B at step S118, controller 18 executes an instruction to scan the image using scanner 24 at a default or user-selected resolution in order to obtain image data for the image that is to be replicated.

At step S120, controller 18 executes instructions to replicate the image by inputting the image data obtained in step S118 into color conversion lookup table 62, which provides digital output values for the user-desired output. For example, the image can be provided in the form of a digital file employing the digital values output by color conversion lookup table 62, or can be replicated in the form of a copy printed by print engine 20 using the output of color conversion lookup table 62.

In contrast to a conventional imaging apparatus, which typically requires a user to make decisions as to how best replicate an image, such as by selecting mapping parameters or selecting the appropriate destination gamut, the present invention, by automatically determining the source and appropriate destination gamuts, and by automatically mapping to the destination gamut, performs the image replication process quickly and optimally, without requiring user intervention or any user decisions, thus reducing the burden on the user in replicating the image.

Figure 4:
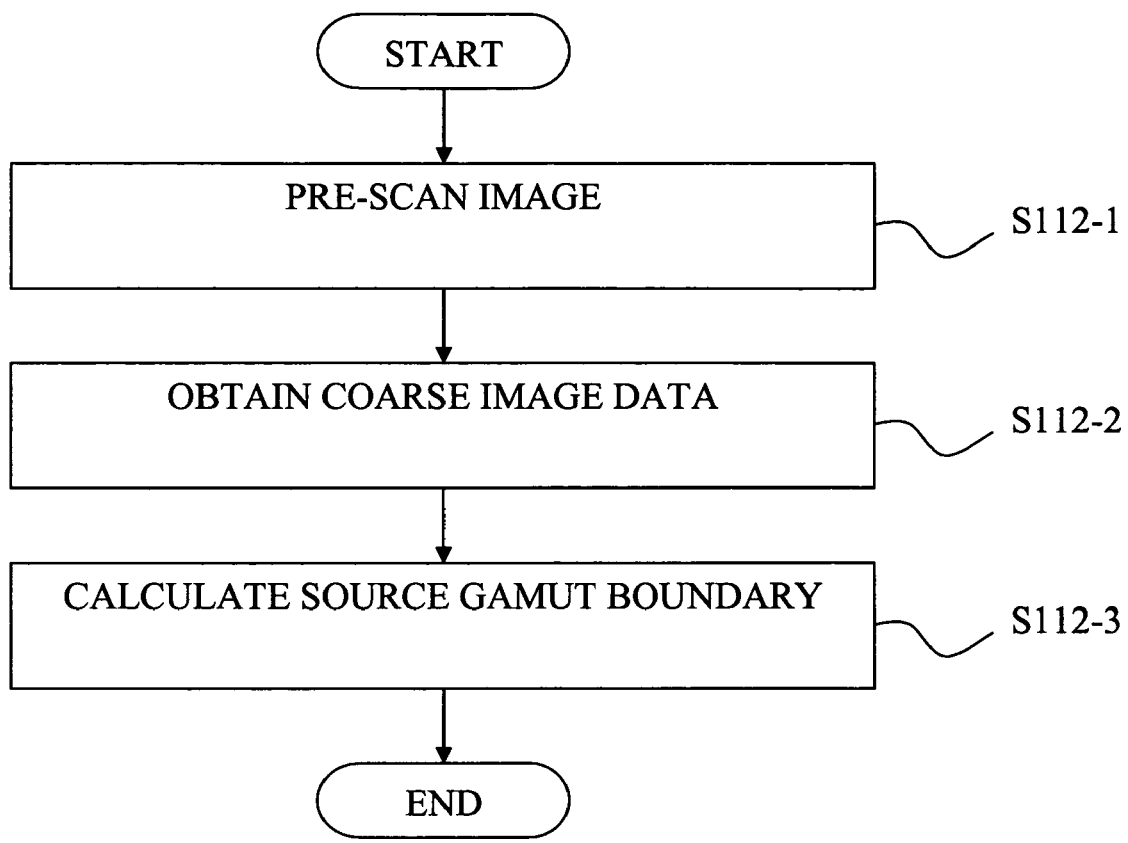
FIG. 4 is a flowchart depicting a method of determining the source gamut boundary of an image in accordance with the embodiment of FIGS. 3A and 3B.

Referring now to FIG. 4, step S112, determining the source gamut boundary (SGB), is explained in greater detail. The source gamut boundary (SGB) describes the three-dimensional outermost extents of the source gamut (SG) in colorspace.

At step S112-1, the image is pre-scanned to obtain pre-scanned image data. The image is pre-scanned at the fastest speed and/or lowest resolution available (e.g., 72 DPI (dots per inch)) in order to learn the color gamut information of the image. The pre-scanned image data stored in memory, for example, memory 36, and used in determining the source gamut boundary.

The gamut boundary can be expressed as a two-variable lookup table:

$$C^* = f(h^*, L^*) \qquad \text{Equation (1)}$$

where $C^*$ is chroma, $h^*$ is hue angle (0 to 359 degrees), $L^*$ is lightness (0 to 100) of the CIELAB color space, and f denotes the function relationship. The hue angle ($h^*$) is evenly sampled as n points, and the lightness ($L^*$) as m points, a total of n×m grid points on a gamut boundary, for example, 18(n)× 21(m) grid points.

At step S112-2, coarse image data is obtained as follows.

After a pre-scanned image is acquired, a fast sampling process of the image pixels is carried out to obtain coarse image data, e.g., using a sampling rate of 1 pixel per 0.5 square millimeters. For example, if the pre-scan is 72 DPI, every other pixel on every other line is sampled (skip one pixel on a line and then skip one line), which is roughly equivalent to sampling 1 pixel per 0.7 mm×0.7 mm=0.49 square millimeters.

At step S112-3, the source gamut is calculated as follows.

The scanned RGB (red, green, blue) values of each sampled pixel are converted to CIELAB device-independent color values (L*, C*, h*), for example, using a relationship determined off-line by the manufacturer, e.g., the manufacturer of the scanner 24 and/or imaging apparatus 12, such as:

$$TSG = g_T(sR, sG, sB) \qquad \text{Equation (2)}$$

where TSG is a color point (L*, a*, b*) of the "Total Source Gamut" of the scanner in the CIELAB Cartesian coordinate system that is inter-changeable with a color point (L*, C*, h*) in the CIELAB cylindrical coordinate system; sR, sG, sB are scanned R, G, and B respectively; and $g_T$ denotes the functional relationship between TSG and (sR, sG, sB), which can be implemented as a lookup table or a group of polynomial functions. Equation 2 is referred to as the total source gamut (TSG) of the scanner because Equation 2 includes all responses of all possible colors for the scanner.

For each sampled pixel, the h* and L* values are used to find the nearest grid among the n×m gamut boundary points. The old C* value of the nearest grid point is replaced by the new C* if the old value is smaller. Otherwise, the old C* remains unchanged. After the sampling for the entire pre-scanned image is completed, an interpolation scheme (e.g. linear interpolation) is used to find interpolated values for any unfound boundary grid points, which completes the task of determining the SGB. The corresponding source gamut (SG) of the scanned image is represented by:

$$SG = g_s(sR, sG, sB) \qquad \text{Equation (3)}$$

Figure 5:
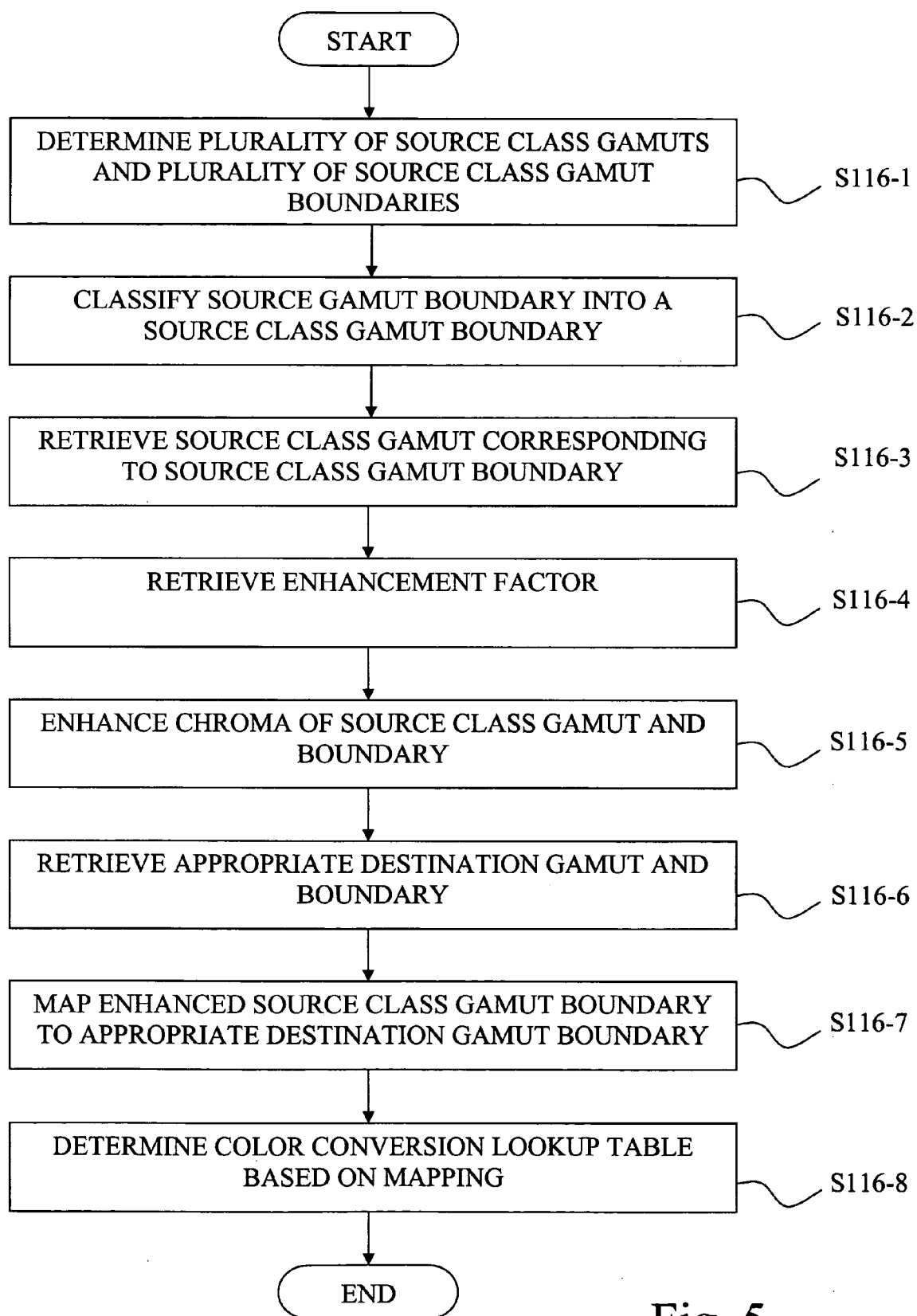
FIG. 5 is a detailed flowchart depicting a class gamut mapping method for converting a source gamut of an image to a destination gamut in accordance with the present invention.

Referring now to FIG. 5, a method of performing class gamut mapping in accordance with the present invention is described.

In class gamut mapping, the source color gamut is first classified into one of the pre-determined number of gamut classes and then the pre-determined mapping of the class is employed for the color reproduction.

At step S116-1, a plurality of source class gamuts and corresponding plurality source class gamut boundaries are determined. For example, equation 3 represents the color responses of one color image on the scanner. If all possible colors are sampled and printed on plain, coated, and glossy types of substrate 44, and are then scanned with scanner 24, respectively, for plain, coated, and glossy paper documents, 3 different sets of source gamuts are obtained, each of which is the total response of all possible colors on the respective substrate types. Each such source gamut is referred to as source class gamut (SCG) and the corresponding gamut boundary as source class gamut boundary (SCGB). The source class gamut is represented by $$SCG_i = g_{Ci}(sR, sG, sB) \; i=1,2,\ldots,v \qquad \text{Equation (4)}$$

where SCG is a color point (L*, a*, b*) in the CIELAB space; sR, sG, sB are scanned R, G, and B respectively; and $g_C$ denotes the functional relationship between SCG and (sR, sG, sB), which can be implemented as a lookup table or a group of polynomial functions. The source class gamuts are determined off-line by the manufacturer for use in performing the class gamut mapping method in accordance with the present invention. The gamut boundaries are arranged by gamut volume, where $SCGB_1 < SCGB_2 < \ldots < SCGB_v$, for a total of v source class gamut boundaries, ($SCGB_i$, i=1, 2, ..., v).

At step S116-2 source gamut boundary (SGB) is classified into one of the source class gamut boundaries in such a way that if $$SCGB_{i-1} < SGB \leq SCGB_i\ i=1,2,\ldots,v, \text{ and } SCGB_0=0 \quad \text{Equation (5)}$$

the source gamut boundary will be classified as SCGBi. This means that not all points of source gamut boundary are included in SCGBi-1 but all of them are in SCGBi, which thus encompasses the source gamut boundary. Any source gamut boundaries that are larger than the largest source class gamut boundary (SCGBv) will be classified as SCGBv. The source class gamut boundary into which the source gamut boundary has been classified is suitable for mapping to the appropriate destination gamut, and hence, is referred to as the suitable source class gamut boundary.

At step S116-3, the source class gamut ($SCG_i$) (Equation 4) corresponding to $SCGB_i$ classified in the step S116-2 is retrieved.

At step S116-4, the enhancement factor is retrieved (e.g., 1.15 which will make the output 15% more colorful). If no enhancement factor is selected by the user, a factory default enhancement factor is retrieved, for example, wherein the default enhancement factor is 1.0.

At step S116-5, the enhancement operation is performed on the chroma of the source class gamut ($SCG_i$), and the source class gamut boundary ($SCGB_i$) is re-computed based on the enhancement factor. The enhancement operation may be non-linear over the entire chroma range within the gamut. For example, the middle tone colors may be scaled by a maximum percentage equaling the selected enhancement factor, and the light and more-colorful colors may be scaled by a less percentage. The enhancement operation, whether based on a user selected enhancement factor or the factor default enhancement factor, yields an enhanced source class gamut boundary ($ESCGB_i$, i=1, 2, ..., v), and the associated gamut (ESCG), represented by:

$$ESCG_i = g_{Ei}(sR,sG,sB)\ i=1,2,\ldots,v \quad \text{Equation (6)}$$

where ESCG is the CIELAB color values (L*, a*, b*), sR, sG, sB are scanned R, G, and B respectively, and $g_E$ denotes the function relationship between ESCG and (sR, sG, sB), which can be implemented as a lookup table or a group of polynomial functions. ESCG gamut data are employed by the present invention as the source class gamuts of the present invention, and the ESCGB gamut boundary data, which is necessarily a subset of ESCG (e.g., since ESCGBi is given by the outermost 3-dimensional extents of ESCGi), are employed by the present invention as the source class gamut boundaries.

At step S116-6, the appropriate destination gamut ($DG_j$) and its boundary ($DGB_j$), selected in step S114, are retrieved.

At step S116-7, the source class gamut ($SCG_i/ESCG_i$) and boundary ($SCGB_i/ESCGB_i$) are mapped into the appropriate destination gamut ($DG_j$) and the appropriate destination gamut boundary ($DGB_j$), respectively, using the gamut mapping algorithm.

At step S116-8, color conversion lookup table 62 is determined based on the mapping of step S116-7 as follows: After gamut mapping, a relationship between the scanned RGB and the dcs of the destination device will be created based on Equations 4 (non-enhanced) or 6 (enhanced), and 0 (destination gamut). For example, for a given scanned (sR, sG, sB) point, a CIELAB color point (L*,a*,b*) can be found using Equation 4 or 6, and used as the left-side value (DG) in Equation 0 to invert Equation 0 to obtain the corresponding destination device digital count value dcs having a range of 0 to 255 for 8-bit color. The relationship is represented, for the default enhancement factor, by:

$$dcs_{ij}=\psi_{ij}(sR,sG,sB)\ i=1,2,\ldots,v, j=1,2,\ldots,q \quad \text{Equation (7)}$$

and for the user-selected enhancement factor, by:

$$dcs_{Eij}=\psi_{Eij}(sR,sG,sB)\ i=1,2,\ldots,v, j=1,2,\ldots,q \quad \text{Equation (8)}$$

where $\psi$ denotes the functional relationship between dcs and (sR, sG, SB), which can be implemented as a lookup table or a group of polynomial functions, and represents color conversion lookup table 62. The subscript E in Equation 8 denotes the user-selected (or default) enhancement factor.

The output image is created by applying the image RGB color values to color conversion lookup table 62, which provides the corresponding output color values in RGB color space for a scan-to-file output, or in CMYK color space for output in the form of a copied image reproduced by print engine 20. For 8-bit color, the output of color conversion lookup table 62 will be 0 to 255 for each input pixel.

Equations 7 and 8 represent color conversion lookup tables for source class gamut i ($SCG_i$) mapped to a destination gamut j ($DG_j$). The lookup table is normally created off-line (e.g., by the manufacturer) and stored in the driver or associated memory for the class gamut mapping method, although it can also be created on-line (e.g., by imaging apparatus 12).

If the color conversion lookup table is created off-line, then stored in one of memory (e.g., memory 36), imaging driver 58, or as firmware in controller 18, are: (1) all supported source class gamut boundaries ($SCGB_i$, i=1, 2, ..., v); (2) all supported destination gamut boundary indexes (j=1, 2, ..., q) to the output substrates/devices; and (3) all color reproduction lookup tables based on user-selectable color enhancement factors (a total of 2vq tables).

If the color conversion lookup table is created on-line, then stored in one of memory (e.g., memory 36), imaging driver 58, or as firmware in controller 18, are: (1) all supported source class gamut ($SCG_i$, i=1, 2, ..., v), and boundaries ($SCGB_i$, i=1, 2, ..., v); (2) all supported destination gamut ($DG_j$, j=1, 2, ..., q) and boundaries ($DGB_j$, j=1, 2, ..., q); and (3) factory-default maximum enhancement factors that may be different for different source class gamuts and/or different destination gamuts.

Alternatively, part or all of the color conversion lookup tables are generated off-line, and the remaining tables are generated on-line using a pre-determined deriving method developed by the manufacturer.

Figure 6:
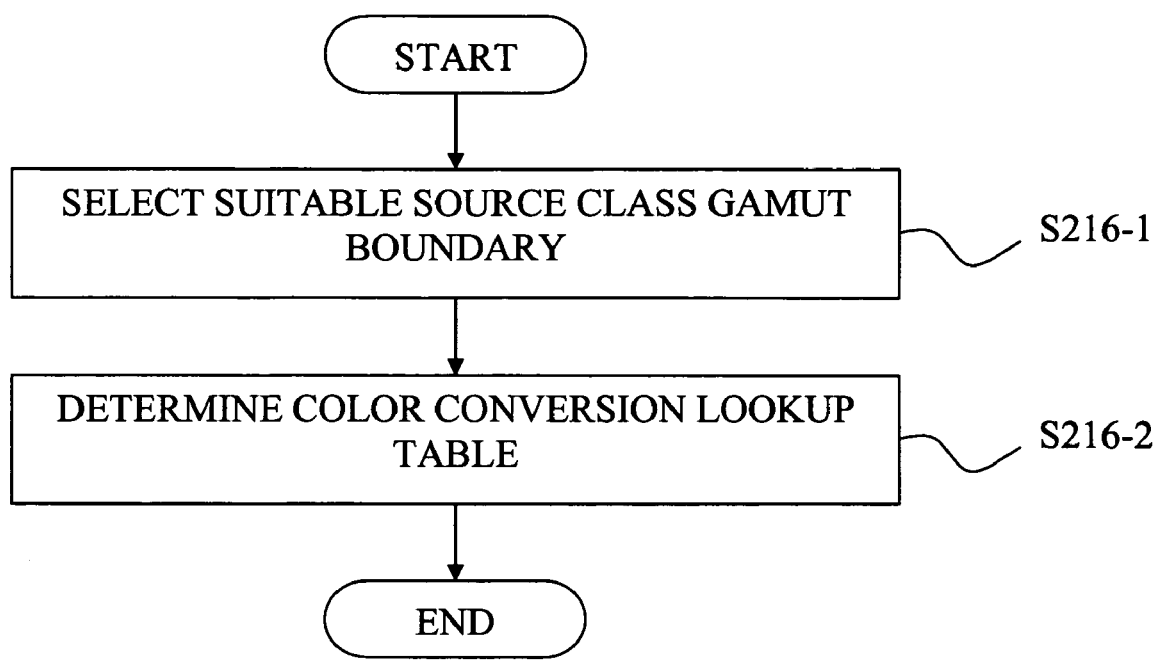
FIG. 6 is a flowchart depicting an embodiment of the class gamut mapping method of FIG. 5, employing offline mapping.

Referring now to FIG. 6, a method of mapping to the appropriate destination gamut using the class gamut mapping method with offline mapping is described.

In the this embodiment, stored in a memory associated with imaging apparatus 12 or accessible to imaging apparatus 12, for example, with imaging driver 58, in memory 36 of controller 18 or memory 46 of host 14, is a plurality of source class gamut boundaries and a plurality of pre-determined color conversion lookup tables corresponding to the plurality of source class gamut boundaries and to the plurality of destination gamuts of imaging apparatus 12, each of which is determined at the factory.

The plurality of source class gamut boundaries is a range of potential source gamut boundaries in which the color gamuts of typical images will lie, with the potential source gamut boundaries arranged by size. The most suitable source class gamut boundary is the smallest potential source class gamut boundary that encompasses the source gamut boundary, hence, encompasses the source gamut. However, in the case where the image gamut is greater than the largest source class gamut, the suitable source class gamut boundary will be the largest source class gamut boundary.

The plurality of pre-determined color conversion lookup tables is matrix of color conversion lookup tables corresponding to all the combinations of each potential source gamut boundary and each of the plurality of destination gamuts. Thus, color conversion lookup table 62 will be selected as that color conversion lookup table that corresponds to the suitable source class gamut boundary, and that corresponds to the appropriate destination gamut boundary.

At step S216-1, controller 18 executes instructions to select a suitable source class gamut boundary from the plurality of source class gamut boundaries based upon similarity of the selected source class gamut boundary's size to the source gamut boundary, as described above in steps S116-1 and S116-2 of FIG. 5.

At step S216-2, color conversion lookup table 62 is determined based on controller 18 executing instructions to select color conversion lookup table 62 from the plurality of pre-determined color conversion lookup tables based on color conversion lookup table 62 corresponding to the suitable source class gamut boundary and to the appropriate destination gamut. The pre-determined color conversion lookup tables are created in the manner described above in steps S116-3 to S116-8 of FIG. 5. The source class boundary and the source class gamut encompass the source gamut boundary and the source gamut, respectively, unless the source gamut boundary is larger than the largest source class gamut boundary.

Figure 7:
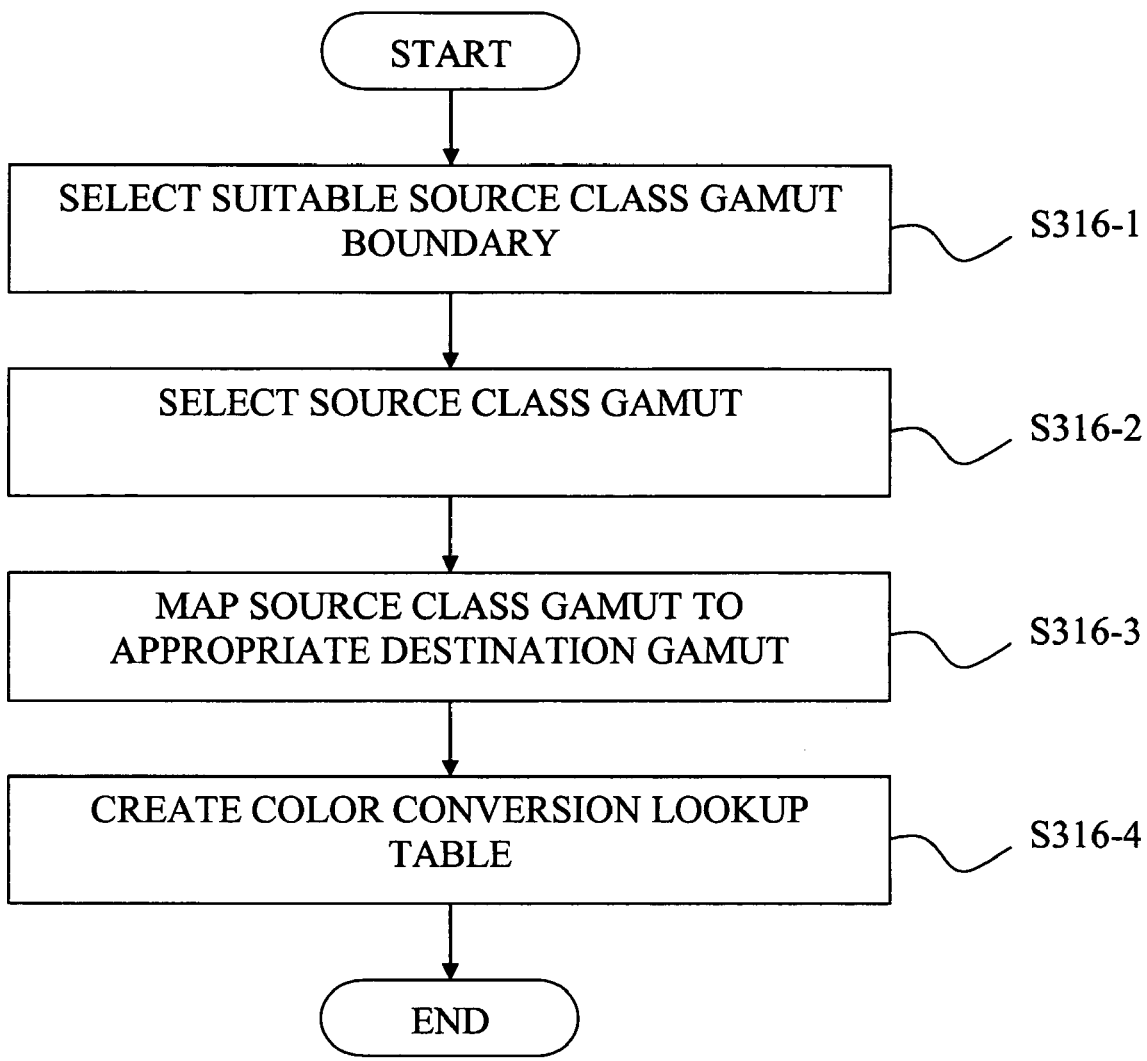
FIG. 7 is a flowchart depicting an embodiment of the class gamut mapping method of FIG. 5, employing online dynamic mapping.

With reference to FIG. 7, a method of mapping to the appropriate destination gamut using class gamut mapping with online dynamic mapping is described.

Stored in a memory associated with imaging apparatus 12 or accessible to imaging apparatus 12, for example, with imaging driver 58, in memory 36 of controller 18 or memory 46 of host 14, is a plurality of source class gamut boundaries, a corresponding plurality of source class gamuts, and a gamut mapping algorithm, each of which is determined at the factory.

The plurality of source class gamut boundaries is a range of potential source gamut boundaries in which the color gamuts of typical images will lie, with the potential source gamut boundaries arranged by size. The most suitable source class gamut boundary is the smallest potential source class gamut boundary that encompasses the source gamut boundary, hence, encompasses the source gamut.

At step S316-1, controller 18 executes instructions to select a suitable source class gamut boundary from the plurality of source class gamut boundaries based upon the similarity of the selected source class gamut boundary's size to the source gamut boundary of the image, as described above in steps S116-1 and S116-2 of FIG. 5.

At step S316-2, controller 18 executes instructions to select a source class gamut corresponding to the suitable source class gamut boundary, as described above in step S116-3 of FIG. 5.

At step S316-3, controller 18 executes instructions to use the gamut mapping algorithm to dynamically map the source class gamut to the appropriate destination gamut, as described above in steps S116-4 to S116-7 of FIG. 5.

At step S316-4, controller 18 executes instructions to create color conversion lookup table 62 based on mapping to the destination gamut. Color conversion lookup table 62 is created as described above in step S116-8 of FIG. 5.

Figure 8:
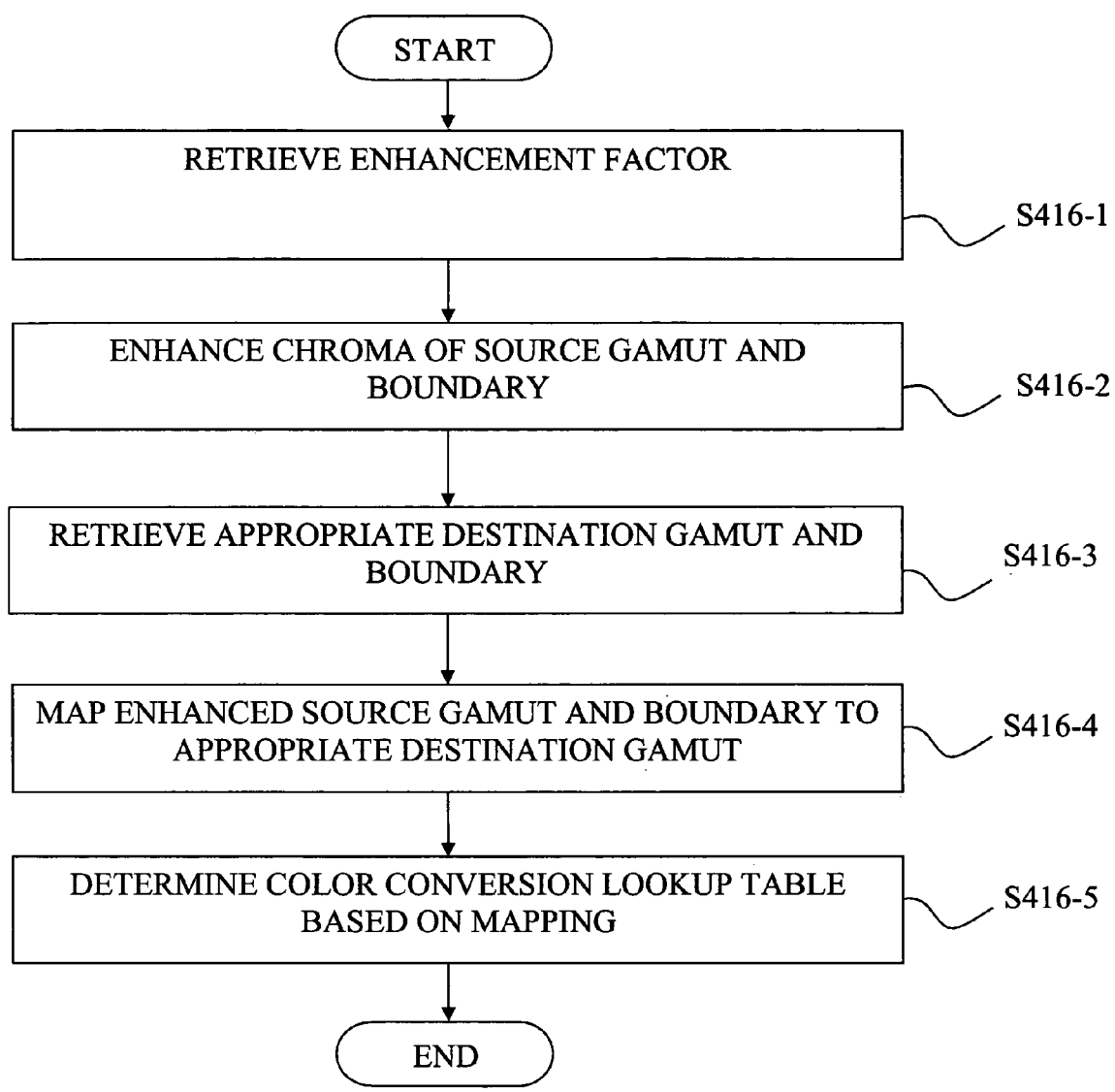
FIG. 8 is a flowchart depicting a method of performing continuous gamut mapping for converting a source gamut of an image to a destination gamut in accordance with an embodiment of the present invention.

Referring now to FIG. 8, a method of continuous gamut mapping in accordance with the present invention is described.

At step S416-1, the enhancement factor is retrieved (e.g., 1.15 which will make the output 15% more colorful). If no enhancement factor is selected by the user, a factory default enhancement factor is retrieved, for example, wherein the default enhancement factor is 1.0.

At step S416-2, the enhancement operation is performed on the chroma of the source gamut (SG) and the source gamut boundary (SGB) is re-computed based on the enhancement factor. The enhancing operation may be non-linear over the entire chroma range within the gamut. For example, the middle tone colors may be scaled by a maximum percentage equaling the maximum enhancing factor and the light and more-colorful colors may be scaled by a less percentage. The enhancement operation, whether based on a user selected enhancement factor or the factory default enhancement factor, yields an enhance source gamut boundary (ESGB) and the associated gamut (ESG), represented below by:

$$ESG = g_E(sR, sG, sB) \qquad \text{Equation (9)}$$

where ESG is the CIELAB color values (L*, a*, b*), sR, sG, sB are scanned R, G, and B respectively, and $g_E$ denotes the function relationship that can be implemented as a lookup table or a group of polynomial functions.

At step S416-3, the appropriate destination gamut ($DG_j$) and its boundary ($DGB_j$), selected in step S114, are retrieved.

At step S416-4, the source gamut, or the enhanced source gamut if the enhancement factor is greater than 1.0, and corresponding boundary are mapped to the appropriate destination gamut and corresponding boundary, respectively, using the gamut mapping algorithm if the source gamut boundary, or the enhanced source gamut boundary, if the enhancement factor is greater than 1.0, is larger than the DGB. Otherwise, no mapping is conducted in order to reproduce the original colors.

At step S416-5, color conversion lookup table 62 is determined based on the mapping of step S116-4 as follows: After gamut mapping, a relationship between the scanned RGB and the dcs of the destination device is created based on Equations 3 (non-enhanced) or 9 (enhanced), and 0 (destination gamut). For example, for a given scanned (sR, sG, sB) point, a CIELAB color point (L*,a*,b*) can be found in Equation 3 or 9, and used as the left-side value (DG) in Equation 0 to invert Equation 0 to obtain the corresponding destination device digital counts (dcs) value, having a range of 0 to 255 for 8-bit color. The relationship is represented, for the default enhancement factor, by:

$$dcs = \psi(sR, sG, sB) \qquad \text{Equation (10)}$$

and for the user-selected enhancement factor, by:

$$dcs_E = \psi_E(sR, sG, sB) \qquad \text{Equation (11)}$$

where ψ denotes the functional relationship between dcs and (sR, sG, SB), which can be implemented as a lookup table or a group of polynomial functions, and represents color conversion lookup table 62. The subscript E in Equation 11 denotes the user-selected (or default) enhancement factor.

The output image is created by applying the image RGB color values to color conversion lookup table 62, which provides the corresponding output color values in RGB color space for a scan-to-file output, or in CMYK color space for output in the form of a copied image reproduced by print engine 20. For 8-bit color, the output of color conversion lookup table 62 will be 0 to 255 for each input pixel.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for converting a source gamut of an image to a destination gamut, comprising:
   providing a plurality of destination gamuts in an imaging apparatus;
   determining a source gamut boundary for said source gamut of said image;
   selecting an appropriate destination gamut from said plurality of destination gamuts based on a desired output;
   mapping to said appropriate destination gamut based at least in part on said source gamut boundary;
   determining a color conversion lookup table based on said mapping to said appropriate destination gamut for use in replicating said image to provide said desired output using said imaging apparatus; and
   replicating said image to provide said desired output using said imaging apparatus.

2. The method of claim 1, further comprising obtaining coarse image data, wherein said source gamut boundary is determined based on said coarse image data.

3. The method of claim 2, further comprising performing a pre-scan of said image to obtain pre-scanned image data, wherein said coarse image data is obtained from said pre-scanned image data.

4. The method of claim 3, wherein said pre-scan is a low resolution, fast pre-scan.

5. The method of claim 1, further comprising:
   selecting an enhancement factor; and
   modifying said source gamut boundary and said source gamut based on said enhancement factor prior to mapping to said appropriate destination gamut.

6. The method of claim 5, wherein said modifying said source gamut boundary and said source gamut is modifying a chroma of said source gamut boundary and of said source gamut, respectively, based on said enhancement factor.

7. The method of claim 1, wherein said desired output is a user choice of one of scanning said image to a file and copying said image.

8. The method of claim 7, wherein said user choice is a default choice.

9. The method of claim 7, wherein said selecting said appropriate destination gamut is performed automatically by said imaging apparatus.

10. The method of claim 1, wherein said appropriate destination gamut is selected based on a type of a substrate used in copying said image.

11. The method of claim 10, further comprising:
   detecting said type of said substrate used in said copying said image.

12. The method of claim 11, wherein said selecting said appropriate destination gamut is performed automatically by said imaging apparatus based at least in part on said detecting said type of said substrate.

13. The method of claim 1, further comprising:
   providing a plurality of source class gamut boundaries; and
   providing a plurality of pre-determined color conversion lookup tables corresponding to said plurality of source class gamut boundaries and to said plurality of destination gamuts,
   wherein said mapping to said destination gamut includes selecting a suitable source class gamut boundary from said plurality of source class gamut boundaries based upon similarity of size to said source gamut boundary; and
   wherein said determining said color conversion lookup table is selecting said color conversion lookup table from said plurality of pre-determined color conversion lookup tables that corresponds to said suitable source class gamut boundary and to said appropriate destination gamut.

14. The method of claim 13, wherein said suitable source class gamut boundary is a smallest source class gamut boundary of said plurality of source class gamut boundaries that encompasses said source gamut and said source gamut boundary.

15. The method of claim 13, wherein said plurality of source class gamut boundaries and said plurality of pre-determined color conversion lookup tables are stored in a memory accessible to said imaging apparatus.

16. The method of claim 15, wherein said memory is a part of said imaging apparatus.

17. The method of claim 1, further comprising:
   providing a plurality of source class gamut boundaries and a corresponding plurality of source class gamuts; and
   providing a gamut mapping algorithm,
   wherein said mapping to said appropriate destination gamut includes:
      selecting a suitable source class gamut boundary from said plurality of source class gamut boundaries based upon similarity of size to said source gamut boundary;
      selecting a source class gamut from said plurality of source class gamuts that corresponds to said suitable source class gamut boundary; and
      using said gamut mapping algorithm to dynamically map said source class gamut to said appropriate destination gamut,
   and
   wherein said determining said color conversion lookup table creates said color conversion lookup table based on said using said gamut mapping algorithm to dynamically map said source class gamut to said appropriate destination gamut.

18. The method of claim 17, wherein said suitable source class gamut boundary is a smallest source class gamut boundary of said plurality of source class gamut boundaries that encompasses said source gamut and said source gamut boundary.

19. The method of claim 17, wherein said plurality of source class gamut boundaries, said corresponding plurality of source class gamuts, and said gamut mapping algorithm are stored in a memory accessible to said imaging apparatus.

20. The method of claim 19, wherein said memory is a part of said imaging apparatus.

21. The method of claim 1, wherein said mapping to said appropriate destination gamut is a continuous online mapping from said source gamut to said appropriate destination gamut performed by said imaging apparatus.

* * * * *